United States Patent [19]

Wakasugi

[11] Patent Number: 4,540,470
[45] Date of Patent: Sep. 10, 1985

[54] DISTILLED WATER PRODUCTION DEVICE

[75] Inventor: Mitsuharu Wakasugi, Koshigaya, Japan

[73] Assignee: Yamamoto Scientific Co., Ltd., Tokyo, Japan

[21] Appl. No.: 611,816

[22] Filed: May 18, 1984

[30] Foreign Application Priority Data

May 20, 1983 [JP]  Japan ............................. 58-74621[U]

[51] Int. Cl.³ .............................................. B01D 3/42
[52] U.S. Cl. .................................... 202/180; 202/181; 202/195; 203/10
[58] Field of Search ............... 202/180, 181, 192, 194, 202/195; 203/10

[56] References Cited

U.S. PATENT DOCUMENTS

| | | | |
|---|---|---|---|
| 3,582,473 | 6/1971 | Barnstead | 202/181 |
| 3,849,260 | 11/1974 | Ruckstuhl | 202/181 |
| 3,907,683 | 9/1975 | Gilmont | 203/10 |
| 4,110,170 | 8/1978 | Kirschman et al. | 202/180 |
| 4,156,631 | 5/1979 | Andrei | 202/192 |

*Primary Examiner*—S. Leon Bashore
*Assistant Examiner*—Andrew J. Anderson
*Attorney, Agent, or Firm*—Schwartz, Jeffery, Schwaab, Mack, Blumenthal & Evans

[57] ABSTRACT

A distilled water production device in which cooling water from a condenser is supplied to the boiler at a constant rate. The device is provided with an overflow tube on the outflow conduit for cooling water from the condenser which diverts excess cooling water away from the boiler to a discharge pipe.

7 Claims, 2 Drawing Figures

DISTILLED WATER PRODUCTION DEVICE

BACKGROUND OF THE INVENTION

This invention relates to a distilled water production device. More specifically, this invention relates to a distilled water production device in which cooling water which has passed through a condenser is fed to the boiler.

In a small-scale distilled water production device in which the cooling water that has passed through the condenser is fed to the boiler, it is necessary to suppress the flow rate of the water supplied to the boiler so as not to cause a reduction in the boiling capacity. In existing models of distillation devices this is done by adjusting the flow rate with a manually-controlled valve. Consequently, there is the problem that when the pressure on the primary side of the manual valve (the primary water supply pressure) fluctuates, so does the flow rate and, hence, so does the amount of water supplied to the boiler.

SUMMARY OF THE INVENTION

An object of the invention is to provide a distilled water production device in which cooling water which has passed through a condenser is fed to a boiler.

Another object of the invention is to provide a distilled water production device in which cooling water is supplied to a boiler from a condenser at a predetermined rate of flow.

A further object of the invention is to provide a distilled water production device in which the rate of flow of cooling water supplied from the condenser to the boiler may be adjusted as desired independently of the flow of cooling water through the condenser.

DETAILED DESCRIPTION OF THE PREFERRED EMBODIMENT

Figure 1:
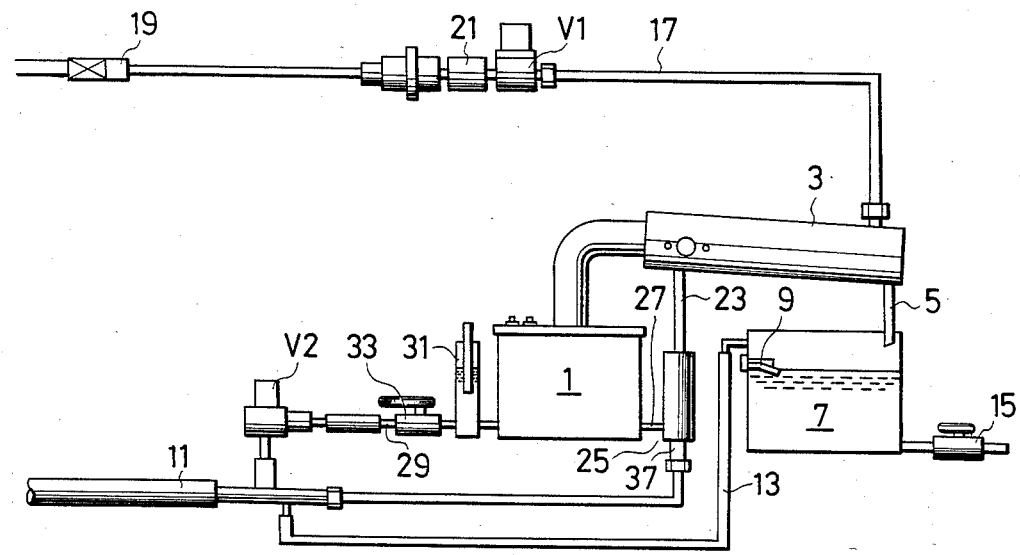
FIG. 1 is a schematic view showing an embodiment of the invention.

Referring to FIG. 1, a boiler 1 has a heater and produces steam. It is connected to the condenser 3. The steam from the boiler 1 is condensed in the condenser 3. The distilled water produced in this condenser 3 flows out through the outflow pipe 5 to the water storage tank 7, where it is stored. Inside the above-mentioned distilled water storage tank 7 there is a float switch 9 which senses the level of the distilled water. At the top of this tank 7 there is an overflow pipe 13 which is connected both to the tank 7 and to the water outflow pipe 1. In addition, at the bottom of the tank 7 there is a regular stopcock 15. Consequently, by firing up the heater which heats the boiler 1, steam is produced which is supplied to the condenser 3, where it is condensed; it then flows out and is stored in the tank 7 and can be drawn off to be used by operating the stopcock 15.

Along the water supply flow path 17 through which cooling water is supplied to the above-mentioned condenser 3, there are a strainer 19, a flow rate control valve 21 which has a pressure compensator and maintains the flow rate constant regardless of fluctuations in the pressure of the primary water supply, and a solenoid valve V1 which opens and closes the supply path, in that sequence. An overflow tube 25 is connected to the outflow path 23 for cooling water from the condenser 3. This overflow tube 25 is also connected to the above-mentioned outflow pipe 11 via a connecting pipe 37. A branch path 27 is connected from the overflow tube 25 to the above-mentioned boiler 1. The flow rate of the cooling water which is supplied to the condenser 3 through the supply path 17 is maintained constant by the action of the flow rate control valve 21. Part of the cooling water which passes through the condenser 3 branches off through the branch path 27 of the overflow tube 25 and is supplied to the boiler 1.

An outflow path 29 connects the above-mentioned water outflow pipe 11 to the above-mentioned boiler 1. Provided along this outflow pipe 29 are a water level sensor 31 which senses the water level inside the boiler, an opening and closing valve 33 and a solenoid valve V2, in that order proceeding from the end connected to the boiler 1. Consequently, the water level inside the boiler 1 can be determined by use of the water level sensor 31 and, by appropriate operation of the opening and closing valve 33 and the solenoid valve V2, the residual water inside the boiler 1 containing concentrated impurities can be removed.

Figure 2:
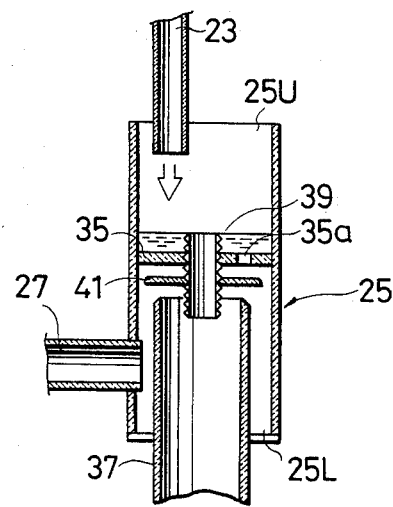
FIG. 2 is an enlarged cross-sectional view showing the overflow tube in the FIG. 1.

The above-mentioned overflow tube 25 might, for example, have the configuration shown in FIG. 2. That is to say, the overflow tube 25 could be divided into an upper chamber 25U and a lower chamber 25L by the flow dividing plate 35 with a small hole 35a in it. The above-mentioned outflow path 23 for cooling water from the condenser is connected to the upper chamber 25U. Both the above-mentioned branch path 27 which is connected to the above-mentioned boiler 1 and the connecting pipe 37 which is connected to the outflow pipe 11 are connected to the lower chamber 25L of the overflow tube 25. The above-mentioned connecting pipe 37 penetrates a considerable distance into the lower chamber 25L; its upper end extends above the above-mentioned branch path 27 and approaches the underside of the flow divider plate 35. A pipe 39, which has a cross-sectional area much larger than that of the above-mentioned small hole 35a, penetrates through the above-mentioned flow divider plate 35. This pipe 39 is displaced laterally from the above-mentioned outflow path 23 so that the cooling water from the outflow path 23 will not flow directly into the pipe 39. The upper end of the above-mentioned pipe 39 sticks up a suitable distance above the flow divider plate 35, and the lower end penetrates into the above-mentioned connecting pipe 37. In addition, the lower part of the pipe 39 passes through an interference plate or baffle 41 which prevents water which passes through the small hole 35a from directly entering the connecting pipe 37. It is desirable for the pipe 39 to be connected to the flow divider plate 35 by some means such as screw threads which permits the height which the top of the pipe 39 sticks up above the flow divider plate 35 to be adjusted.

In the configuration described above, part of the cooling water which flows into the upper chamber 25U of the overflow tube 25 from the condenser 3 passes through the small hole 35a in the flow divider plate 35 and flows over baffle 41 into the lower chamber 25L and is supplied to the boiler 1 through the branch path 27. The greater part of the cooling water which flows into the above-mentioned upper chamber 25U overflows over the top end of the pipe 39 and flows out through the connecting pipe 37 to the outflow pipe 11.

Consequently, the height of the cooling water inside the upper chamber 25U of the overflow tube 25 (the water head) is held constant, so that the amount of water supplied to the boiler 1 through the small hole 35a in the flow divider plate 35 is held constant. If it should become necessary to vary the amount of water supplied to the boiler 1 due to a change in the evaporation capacity of the boiler 1, the height which the pipe 39 sticks up above the flow divider plate 35 can be adjusted to vary the water head in the upper chamber 25U of the overflow tube 25.

As can be understood from the above description of a particular embodiment, even in a case in which the water pressure and flow rate of the primary water supply to the condenser fluctuate, the flow rate of water supplied to the boiler is held constant by the action of the overflow tube. Consequently, there is no problem with the evaporation capacity of the boiler being reduced due to excessive supply of water.

The usefulness of this invention is not limited to the particular embodiment described above. By making suitable modifications it can be used in other embodiments as well.

What is claimed is:

1. A distilled water production device comprising:
   a boiler for producing steam,
   a condenser for condensing the steam supplied from said boiler by means of cooling water,
   means for supplying the cooling water to said condenser,
   an outflow path for the cooling water connected to said condenser,
   an overflow tube provided along said outflow path and divided into an upper chamber and a lower chamber by a flow dividing plate, said upper chamber receiving cooling water from said outflow path,
   means for discharging excess cooling water from inside of said upper chamber comprising a pipe passing through said dividing plate from said upper chamber to said lower chamber and communicating between said upper chamber and said lower chamber so as to keep the height of the cooling water retained in said upper chamber constant,
   said flow dividing plate being formed with at least one hole through which the cooling water falls from said upper chamber into said lower chamber at a predetermined rate of flow, and
   means for supplying cooling water to said boiler from said lower chamber.

2. A distilled water production device according to claim 1, wherein,
   said pipe is threadably engaged with a thread formed on said dividing plate so that the vertical position of said pipe can be adjusted.

3. A distilled water production device according to claim 2, further comprising means for controlling the flow rate of the cooling water supplied to said condenser.

4. A distilled water production device according to claim 1, further comprising means for collecting condensed steam from said condenser.

5. A distilled water production device according to claim 1, wherein said outflow path comprises a connecting pipe with a receiving opening larger than the diameter of the pipe which passes through said flow dividing plate, said receiving opening being positioned underneath the pipe which passes through the flow dividing plate to receive water discharged therefrom.

6. A distilled water production device according to claim 5, wherein the pipe which passes through the flow dividing plate is provided on its lower portion with an interference plate disposed between the hole through which cooling water falls from the upper chamber to the lower chamber of said overflow tube and the receiving opening of said connecting pipe for preventing water which passes through said hole from entering said connecting pipe.

7. A distilled water production device according to claim 5, wherein the diameter of the pipe which passes through the flow dividing plate is larger than the diameter of the hole through which cooling water falls from the upper chamber into the lower chamber of said overflow tube.

* * * * *

UNITED STATES PATENT AND TRADEMARK OFFICE
CERTIFICATE OF CORRECTION

PATENT NO. : 4,540,470

DATED : September 10, 1985

INVENTOR(S) : Mitsuharu WAKASUGI

It is certified that error appears in the above-identified patent and that said Letters Patent is hereby corrected as shown below:

On the Title Page, Item [73], "Yamamoto Scientific Co., Ltd." should read --Yamato Scientific Co., Ltd.--.

Signed and Sealed this

Twenty-fifth Day of March 1986

[SEAL]

Attest:

DONALD J. QUIGG

Attesting Officer

Commissioner of Patents and Trademarks